(12) United States Patent
Michiuchi et al.

(10) Patent No.: US 10,961,609 B2
(45) Date of Patent: Mar. 30, 2021

(54) CEMENTED CARBIDE, CUTTING TOOL CONTAINING THE SAME, AND METHOD OF MANUFACTURING CEMENTED CARBIDE

(71) Applicant: SUMITOMO ELECTRIC INDUSTRIES, LTD., Osaka (JP)

(72) Inventors: Masato Michiuchi, Itami (JP); Kosuke Fukae, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/341,795

(22) PCT Filed: Apr. 16, 2018

(86) PCT No.: PCT/JP2018/015683
§ 371 (c)(1),
(2) Date: Apr. 12, 2019

(87) PCT Pub. No.: WO2018/194018
PCT Pub. Date: Oct. 25, 2018

(65) Prior Publication Data
US 2020/0048747 A1  Feb. 13, 2020

(30) Foreign Application Priority Data

Apr. 19, 2017 (JP) .............................. JP2017-082623
Nov. 27, 2017 (WO) .................. PCT/JP2017/042364

(51) Int. Cl.
*C22C 29/04* (2006.01)
*B22F 1/02* (2006.01)
(Continued)

(52) U.S. Cl.
CPC ................ *C22C 29/04* (2013.01); *B22F 1/02* (2013.01); *B22F 7/008* (2013.01); *B23B 27/14* (2013.01);
(Continued)

(58) Field of Classification Search
CPC ......... C22C 29/005; C22C 29/04; C22C 1/05; B22F 1/02; B22F 7/008; B23B 27/14; B23B 51/00
See application file for complete search history.

(56) References Cited

U.S. PATENT DOCUMENTS

| 4,983,212 A | * | 1/1991 | Iyori | ........................ | C22C 29/02 |
| | | | | | 428/552 |
| 5,766,742 A | * | 6/1998 | Nakamura | ............... | C22C 29/04 |
| | | | | | 407/119 |
| 2013/0036866 A1 | * | 2/2013 | Tamura | .................. | B22F 3/1021 |
| | | | | | 75/240 |

FOREIGN PATENT DOCUMENTS

| CN | 1830807 A | | 9/2006 | | |
| GB | 1503784 A | * | 3/1978 | ............. | C22C 29/04 |

(Continued)

OTHER PUBLICATIONS

JP-6068830-B2 Espacenet translation (Year: 2017).*

*Primary Examiner* — Anthony J Zimmer
*Assistant Examiner* — Ricardo D Morales
(74) *Attorney, Agent, or Firm* — Baker Botts L.L.P.; Michael A. Sartori

(57) ABSTRACT

Cemented carbide contains first hard-phase particles containing WC, second hard-phase particles which contain carbonitride containing at least Ti and Nb, and a metallic binder phase containing an iron-group element. The second hard-phase particle includes a granular core portion and a peripheral portion which covers at least a part of the core portion. The core portion contains composite carbonitride (Continued)

expressed as $Ti_{1-X-Y}Nb_XW_YC_{1-Z}N_Z$, where Y is not smaller than 0 and not greater than 0.05 and Z is not smaller than 0.3 and not greater than 0.6. The peripheral portion is different in composition from the core portion.

10 Claims, 1 Drawing Sheet

(51) Int. Cl.
- *B22F 7/00* (2006.01)
- *B23B 27/14* (2006.01)
- *B23B 51/00* (2006.01)
- *C22C 1/05* (2006.01)
- *C22C 29/00* (2006.01)

(52) U.S. Cl.
CPC ................ *B23B 51/00* (2013.01); *C22C 1/05* (2013.01); *C22C 29/005* (2013.01)

(56) References Cited

FOREIGN PATENT DOCUMENTS

| | | | | |
|---|---|---|---|---|
| JP | 6068830 B2 * | 1/2017 | ............ | B22F 1/0011 |
| WO | 2011/136197 A1 | 11/2011 | | |

\* cited by examiner

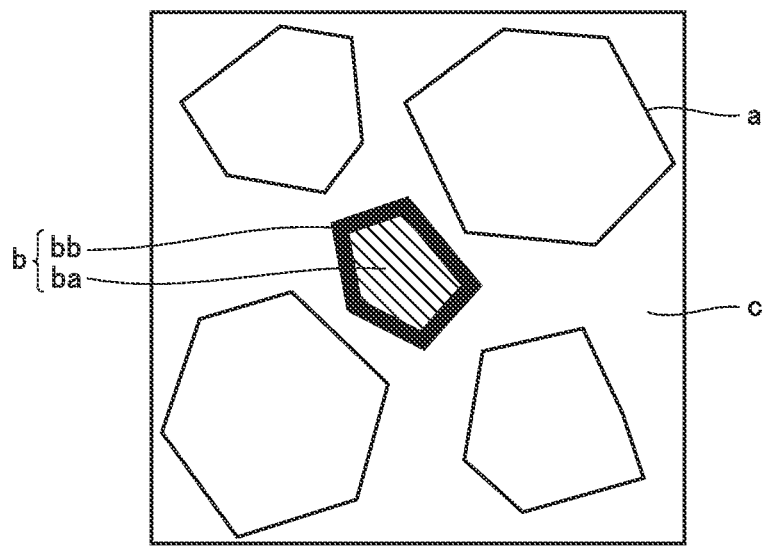

10,961,609 B2

CEMENTED CARBIDE, CUTTING TOOL CONTAINING THE SAME, AND METHOD OF MANUFACTURING CEMENTED CARBIDE

The present invention relates to cemented carbide, a cutting tool containing the same, and a method of manufacturing cemented carbide. The present application claims priority to Japanese Patent Application No. 2017-082623 filed on Apr. 19, 2017 and International Application No. PCT/JP2017/042364 filed on Nov. 27, 2017, the entire contents of the Japanese Patent Application being incorporated herein by reference.

TECHNICAL FIELD

Background Art

Cemented carbide and cermet have been known as a hard material containing Ti. Since such a hard material is excellent in wear resistance, it is suitably used for a cutting tool and a wear-resistant tool. For example, WO2011/136197 (PTL 1) discloses cermet composed of a first hard phase composed of a composite carbonitride solid solution, a second hard phase composed of WC, and a binder phase mainly composed of both or one of Co and Ni.

CITATION LIST

Patent Literature

PTL 1: WO2011/136197

SUMMARY OF INVENTION

Cemented carbide according to one manner of the present disclosure contains first hard-phase particles containing WC, second hard-phase particles which contain carbonitride containing at least Ti and Nb, and a metallic binder phase containing an iron-group element. The second hard-phase particle includes a granular core portion and a peripheral portion which covers at least a part of the core portion. The core portion contains composite carbonitride expressed as $Ti_{1-X-Y}Nb_XW_YC_{1-Z}N_Z$, where Y is not smaller than 0 and not greater than 0.05 and Z is not smaller than 0.3 and not greater than 0.6. The peripheral portion is different in composition from the core portion.

A cutting tool according to one manner of the present disclosure contains the cemented carbide.

A method of manufacturing cemented carbide according to one manner of the present disclosure is a method of manufacturing cemented carbide including a first step of obtaining powders of composite carbonitride expressed as $Ti_{1-X-Y}Nb_XW_YC_{1-Z}N_Z$, a second step of obtaining mixed powders by mixing the powders of the composite carbonitride, WC powders, and powders of an iron-group element, a third step of obtaining a formed material by pressing the mixed powders, and a fourth step of obtaining a sintered material by sintering the formed material. Y is not smaller than 0 and not greater than 0.05 and Z is not smaller than 0.3 and not greater than 0.6. The first step includes a first operation of obtaining third powders by mixing first powders containing two elements of Ti and Nb or three elements of Ti, Nb, and W and second powders containing at least graphite, a second operation of obtaining a granulated material by granulating the third powders, a third operation of obtaining a powder precursor composed of the composite carbonitride by subjecting the granulated material to heat treatment at a temperature not lower than 1800° C. in an atmosphere containing nitrogen gas, and a fourth operation of obtaining the powders of the composite carbonitride by breaking the powder precursor.

BRIEF DESCRIPTION OF DRAWINGS

FIG. 1 is a schematic diagram schematically showing a cross-section of cemented carbide according to the present embodiment.

DETAILED DESCRIPTION

Problem to be Solved by the Present Disclosure

In a hard material in PTL 1, the composite carbonitride solid solution includes a core expressed as $(Ti_{1-x-y}L_xMo_y)(C_{1-z}N_z)$. In this chemical formula, L represents at least one element selected from the group consisting of Zr, Hf, Nb, and Ta, x is not smaller than 0.01 and not greater than 0.5, y is not smaller than 0.03 and not greater than 0.05, and z is not smaller than 0.05 and not greater than 0.75. Therefore, in the composite carbonitride solid solution, an atomic ratio of Mo occupied in all metal elements (Ti, L, and Mo) is not lower than 0.03. Mo, however, lowers resistance of carbonitride itself against reactivity with steel, and therefore a content thereof is preferably low. Therefore, a desired hard material with excellent resistance against reactivity with steel has not yet been obtained and development thereof has highly been demanded.

Under the circumstances, an object of the present disclosure is to provide cemented carbide with excellent resistance against reactivity with steel, a cutting tool containing the same, and a method of manufacturing cemented carbide.

Effect of the Present Disclosure

According to the above, cemented carbide with excellent resistance against reactivity with steel, a cutting tool containing the same, and a method of manufacturing cemented carbide can be provided.

Description of Embodiment of the Invention of the Present Application

The present inventors have developed cemented carbide in which TiNbWCN and TiNbCN are applied as new source materials. The present inventors have found that TiNbWCN and TiNbCN are higher in resistance against reactivity with steel than a conventional Ti-based compound. In particular, the present inventors have found that mechanical strength and resistance against reactivity with steel can both be achieved by appropriately controlling a composition of Nb, W, and N, and derived the present disclosure.

Embodiments of the present invention are initially listed and described.

[1] Cemented carbide according to one manner of the present disclosure contains first hard-phase particles containing WC, second hard-phase particles which contain carbonitride containing at least Ti and Nb, and a metallic binder phase containing an iron-group element. The second hard-phase particle includes a granular core portion and a peripheral portion which covers at least a part of the core portion. The core portion contains composite carbonitride expressed as $Ti_{1-X-Y}Nb_XW_YC_{1-Z}N_Z$, where Y is not smaller than 0 and not greater than 0.05 and Z is not smaller than 0.3 and not greater than 0.6. The peripheral portion is different in composition from the core portion. Cemented carbide composed as such can be excellent in resistance against reactivity with steel and excellent also in mechanical strength.

[2] The peripheral portion is preferably composed to be higher in content of W than the core portion. Resistance against reactivity with steel is thus particularly excellent.

[3] X is preferably not smaller than 0.1 and not greater than 0.6. Particularly excellent resistance against reactivity with steel and also noticeable wear resistance and chipping resistance can thus be obtained.

[4] X is preferably not smaller than 0.1 and not greater than 0.2. Particularly excellent resistance against reactivity with steel as well as more noticeable wear resistance can thus be obtained.

[5] X is preferably not smaller than 0.4 and not greater than 0.6. Particularly excellent resistance against reactivity with steel as well as more noticeable chipping resistance can thus be obtained.

[6] In the core portion, a total amount of V, Cr, and Mo occupied in a total amount of Ti, Nb, W, V, Cr, and Mo is preferably smaller than 2 atomic %. Since V, Cr, and Mo representing elements which affect characteristics of cemented carbide can thus sufficiently be suppressed, higher mechanical strength and resistance against reactivity with steel can be achieved.

[7] The core portion preferably has a particle size at 50% in a number-based cumulative distribution not greater than 1.5 μm. Particularly bending strength and chipping resistance among mechanical strengths can thus be improved.

[8] A volume ratio of the core portion in the cemented carbide is preferably not lower than 2 volume % and not higher than 20 volume %. Further higher mechanical strength and resistance against reactivity with steel can thus be obtained.

[9] A cutting tool according to one manner of the present disclosure contains the cemented carbide. Such a cutting tool can simultaneously achieve improved various characteristics of wear resistance and chipping resistance as well as bending strength attributed to high mechanical strength and resistance against reactivity with steel of cemented carbide.

[10] The cutting tool preferably includes a substrate composed of the cemented carbide and a coating film which covers the substrate. Such a cutting tool can also simultaneously achieve improved various characteristics of wear resistance and chipping resistance as well as bending strength attributed to high mechanical strength and resistance against reactivity with steel of cemented carbide.

[11] A method of manufacturing cemented carbide according to one manner of the present disclosure is a method of manufacturing cemented carbide including a first step of obtaining powders of composite carbonitride expressed as $Ti_{1-X-Y}Nb_XW_YC_{1-Z}N_Z$, a second step of obtaining mixed powders by mixing the powders of the composite carbonitride, WC powders, and powders of an iron-group element, a third step of obtaining a formed material by pressing the mixed powders, and a fourth step of obtaining a sintered material by sintering the formed material. Y is not smaller than 0 and not greater than 0.05 and Z is not smaller than 0.3 and not greater than 0.6. The first step includes a first operation of obtaining third powders by mixing first powders containing two elements of Ti and Nb or three elements of Ti, Nb, and W and second powders containing at least graphite, a second operation of obtaining a granulated material by granulating the third powders, a third operation of obtaining a powder precursor composed of the composite carbonitride by subjecting the granulated material to heat treatment at a temperature not lower than 1800° C. in an atmosphere containing nitrogen gas, and a fourth operation of obtaining the powders of the composite carbonitride by breaking the powder precursor. With such a method of manufacturing cemented carbide, cemented carbide capable of achieving both of excellent mechanical strength and resistance against reactivity with steel can be obtained.

Details of Embodiment of the Invention of the Present Application

Though an embodiment of the present invention (hereinafter also denoted as the "present embodiment") will further be described hereinafter in detail, the present embodiment is not limited thereto. The description will be given below with reference to drawings.

An expression in a format "A to B" herein means the upper limit and the lower limit of a range (that is, not smaller than A and not greater than B). When a unit is not given for A but a unit is given only for B, A and B are common in unit. When a compound is herein expressed with a chemical formula and when an atomic ratio is not particularly limited, all atomic ratios that have conventionally been known are encompassed and the atomic ratio should not necessarily be limited only to those in a stoichiometric range. For example, when an expression "TiAlN" is given, a ratio among atoms which form TiAlN is not limited to Ti:Al:N=0.5:0.5:1 but all atomic ratios that have conventionally been known are encompassed. This is also applicable to an expression of a compound other than "TiAlN." In the present embodiment, a metal element such as titanium (Ti), aluminum (Al), silicon (Si), tantalum (Ta), chromium (Cr), niobium (Nb), or tungsten (W) and a non-metal element such as nitrogen (N), oxygen (O), or carbon (C) does not necessarily have to have a stoichiometric composition. "Mechanical strength" herein means mechanical strength including various characteristics such as wear resistance, chipping resistance, and bending strength of cemented carbide.

[Cemented Carbide]

Cemented carbide according to the present embodiment contains first hard-phase particles a containing WC, second hard-phase particles b which contain carbonitride containing at least Ti and Nb, and a metallic binder phase c containing an iron-group element as shown in FIG. 1. Second hard-phase particle b includes a granular core portion ba and a peripheral portion bb which covers at least a part of core portion ba. Core portion ba contains composite carbonitride expressed as $Ti_{1-X-Y}Nb_XW_YC_{1-Z}N_Z$, where Y is not smaller than 0 and not greater than 0.05 and Z is not smaller than 0.3 and not greater than 0.6. Peripheral portion bb is different in composition from core portion ba. In particular, peripheral portion bb is preferably composed to be higher in content of W than core portion ba. Cemented carbide composed as such can be excellent in resistance against reactivity with steel and excellent also in mechanical strength.

<First Hard-Phase Particle>

First hard-phase particles a contain WC. First hard-phase particles a are mainly composed of tungsten carbide (WC). First hard-phase particles a can contain, in addition to WC, an inevitable element introduced in a process for manufacturing WC and a trace amount of an impurity element. A content of WC in first hard-phase particles a is preferably not lower than 99 mass % and more preferably substantially 100 mass % from a point of view of an effect of the present disclosure. Examples of an element other than W and C which can be contained in first hard-phase particles a can include molybdenum (Mo) and chromium (Cr).

<Second Hard-Phase Particle>

Second hard-phase particles b contain carbonitride containing at least Ti and Nb. In particular, second hard-phase particle b includes granular core portion ba and peripheral portion bb which covers at least a part of core portion ba. Core portion ba contains composite carbonitride expressed as $Ti_{1-X-Y}Nb_XW_YC_{1-Z}N_Z$ where Y is not smaller than 0 and not greater than 0.05 and Z is not smaller than 0.3 and not greater than 0.6. Peripheral portion bb is different in composition from core portion ba. In particular, peripheral portion bb is preferably composed to be higher in content of W than core portion ba. When granular core portion ba in second hard-phase particle b has a composition (Ti, Nb, W, C, and N) at an atomic ratio within the range described above, cemented carbide can achieve both of excellent mechanical strength and resistance against reactivity with steel.

In the composite carbonitride expressed as $Ti_{1-X-Y}Nb_XW_YC_{1-Z}N_Z$ in core portion ba, X is preferably not smaller than 0.1 and not greater than 0.6 and further preferably not smaller than 0.1 and not greater than 0.2. X is also further preferably not smaller than 0.4 and not greater than 0.6. Excellent resistance against reactivity with steel as well as more noticeable wear resistance and chipping resistance can thus be obtained.

(Core Portion)

Core portion ba contains composite carbonitride expressed as $Ti_{1-X-Y}Nb_XW_YC_{1-Z}N_Z$. X exceeds 0 and is smaller than 1, Y is not smaller than 0 and not greater than 0.05, and Z is not smaller than 0.3 and not greater than 0.6. Core portion ba is mainly composed of Ti and contains Nb as a sub component. The core portion may further contain W as a third component. When values of X and Y are within the range described above, composite carbonitride can achieve both of improved mechanical strength and resistance against reactivity with steel in a balanced manner. An atomic ratio X of Nb is preferably not lower than 0.1 and not higher than 0.6, more preferably not lower than 0.1 and not higher than 0.2, and most preferably not lower than 0.13 and not higher than 0.17. X is also more preferably not smaller than 0.4 and not greater than 0.6. An atomic ratio Y of W is preferably not lower than 0 and not higher than 0.03. An atomic ratio (1-X-Y) of Ti is preferably not lower than 0.75 and not higher than 0.9 from a point of view of setting an amount of addition of the sub component and the third component to at most a solid solubility limit and sufficiently exhibiting an effect of an added metal element. Z which represents an atomic ratio of carbon (C) and nitrogen (N) in the composite carbonitride is preferably not lower than 0.4 and not higher than 0.6. Though a composition of core portion ba should not particularly be restricted so long as the effect of the present disclosure is exhibited and a composition thereof is different from that of peripheral portion bb, exemplary compositions can include $Ti_{0.85}Nb_{0.15}C_{0.5}N_{0.5}$ and $Ti_{0.8}Nb_{0.17}W_{0.03}C_{0.45}N_{0.55}$.

In core portion ba, a total amount of V, Cr, and Mo occupied in a total amount of Ti, Nb, W, V, Cr, and Mo is preferably lower than 2 atomic %. The total content of V, Cr, and Mo occupied in the total amount of Ti, Nb, W, V, Cr, and Mo in core portion ba is more preferably not higher than 1 atomic %. The content is most preferably 0.

Core portion ba may contain an element such as V, Cr, and Mo described above as an impurity or a trace element in addition to Ti which is a main component, Nb which is a sub component, and W which is a third component. In the present embodiment, a total content of V, Cr, and Mo among the elements above is preferably lower than 2 atomic % with respect to all of these metal elements. Higher mechanical strength and resistance against reactivity with steel can thus be obtained. When the content is not lower than 2 atomic %, these impurities tend to affect mechanical strength and resistance against reactivity with steel of carbonitride itself.

A composition and an atomic ratio of the composite carbonitride contained in core portion ba can be identified by analyzing a cut plane obtained by cutting cemented carbide along an arbitrary plane with an energy dispersive X-ray spectroscope (EDX) or an electron probe microanalyzer (EPMA) attached to a scanning electron microscope (SEM). A composition and an atomic ratio of the composite carbonitride can be found by preparing a cut plane of one piece of cemented carbide and subjecting core portion ba included in a second hard-phase particle which appears in the cut plane to measurement with the apparatus. A content of WC in first hard-phase particles and a content of an iron-group element in a metallic binder phase which will be described later can also be identified by the same measurement method by subjecting a first hard-phase particle or the metallic binder phase which appears in the cut plane to measurement. A more detailed composition of composite carbonitride contained in core portion ba can be identified by taking a sample piece from the cut plane with focused ion beam (FIB) and subjecting a cross-section of the sample piece to EDX attached to a transmission electron microscope (TEM).

Core portion ba is granular and has a grain size at 50% in a number-based cumulative distribution (which is also denoted as "D50 of the core portion" below) preferably not greater than 1.5 µm. Namely, a plurality of core portions ba which appear in the cut plane have D50 preferably not greater than 1.5 µm. Particularly bending strength and chipping resistance among mechanical strengths can thus be improved. Core portion ba has D50 more preferably not greater than 1 µm and further preferably not greater than 0.7 µm, and a lower limit value thereof is 0.1 µm.

A grain size of core portion ba can be found by subjecting an SEM image of a cross-section (a cut plane) of cemented carbide to image analysis. For example, ImageJ (https://imagej.nih.gov/ij/) can be used as software to be used for image analysis. The "grain size" of core portion ba means a maximum Feret diameter. A population parameter for finding D50 of core portion ba is set to at least 50 and preferably to at least 100. An SEM image for image analysis is to be picked up at a magnification of 3000 to 5000× from a point of view of accuracy in analysis, and core portions ba in number satisfying the population parameter are preferably prepared by setting a plurality of fields of view.

A volume ratio of core portion ba occupied in cemented carbide is preferably not lower than 2 volume % and not higher than 20 volume %. Further higher mechanical strength and resistance against reactivity with steel can thus be obtained. A volume ratio of core portion ba occupied in cemented carbide is more preferably not lower than 10 volume % and not higher than 20 volume %.

A volume ratio of core portion ba occupied in cemented carbide can be found as in analysis of a grain size. More specifically, an area ratio of core portion ba in an observation field of view can be found by preparing the cut plane described above, observing the cut plane with the SEM at a magnification from 3000 to 5000×, and analyzing an image with the software described above. Then, the area ratio is regarded as a volume ratio of core portion ba occupied in cemented carbide by regarding the area ratio as continuing also in a direction of depth of the cut plane. A volume ratio of core portion ba occupied in cemented carbide can thus be found. An average value calculated by preparing SEM images of one cut plane picked up in at least three fields of view is preferably defined as a volume ratio of core portion ba occupied in cemented carbide.

(Peripheral Portion)

Second hard-phase particle b includes peripheral portion bb which covers at least a part of core portion ba. Peripheral portion bb is formed in a step of sintering cemented carbide (a fourth step) which will be described later. Peripheral portion bb is formed around core portion ba as a composition in which composite carbonitride (that is, TiNbCN or TiNbWCN) is enriched with WC as a result of formation of a solid solution and re-precipitation of particles of composite carbonitride and WC particles therearound in liquid phase sintering. Therefore, peripheral portion bb is different in composition from core portion ba.

Peripheral portion bb functions as an adhesive layer which enhances adhesion strength between second hard-phase particle b and metallic binder phase c. Lowering in interfacial strength between second hard-phase particle b and metallic binder phase c can thus be suppressed and mechanical characteristics of cemented carbide can thus be improved. Peripheral portion bb may partially or entirely cover core portion ba so long as the effect of the present disclosure is exhibited, and a thickness thereof should not be limited. A composition of peripheral portion bb should not particularly be restricted so long as the effect of the present disclosure is exhibited and the peripheral portion is different in composition from core portion ba, however, exemplary compositions thereof can include $Ti_{0.77}Nb_{0.13}W_{0.1}C_{0.5}N_{0.5}$ and $Ti_{0.67}Nb_{0.13}W_{0.2}C_{0.65}N_{0.35}$. Peripheral portion bb is thus preferably composed to be higher in content of W than core portion ba.

<Metallic Binder Phase>

Metallic binder phase c contains an iron-group element. Metallic binder phase c is mainly composed of an iron-group element. Metallic binder phase c can contain, in addition to the iron-group element, an inevitable element introduced from first hard-phase particles a and second hard-phase particles b and a trace amount of an impurity element. From a point of view of maintaining a state as a metal and avoiding formation of a brittle intermediate compound, a content of the iron-group element in metallic binder phase c is preferably not lower than 90 atomic % and more preferably not lower than 95 atomic %. The upper limit of the content of the iron-group element in metallic binder phase c is 100 atomic %. The iron-group element refers to group 8, group 9, and group 10 elements in the fourth period, that is, iron (Fe), cobalt (Co), and nickel (Ni). Examples of elements other than the iron-group element contained in metallic binder phase c include titanium (Ti) and tungsten (W).

Metallic binder phase c in cemented carbide in the present embodiment is mainly composed preferably of Co. A content of the iron-group element except for Co in metallic binder phase c is preferably lower than 1 volume % and more preferably lower than 0.5 volume %.

[Method of Manufacturing Cemented Carbide]

Though a method of manufacturing cemented carbide according to the present embodiment should not particularly be restricted, a method below is preferred. The method of manufacturing cemented carbide includes a first step of obtaining powders of composite carbonitride expressed as $Ti_{1-X-Y}Nb_XW_YC_{1-Z}N_Z$, a second step of obtaining mixed powders by mixing the powders of the composite carbonitride, WC powders, and powders of an iron-group element, a third step of obtaining a formed material by pressing the mixed powders, and a fourth step of obtaining a sintered material by sintering the formed material. In $Ti_{1-X-Y}Nb_XW_YC_{1-Z}N_Z$, Y is not smaller than 0 and not greater than 0.05 and Z is not smaller than 0.3 and not greater than 0.6. With such a manufacturing method, cemented carbide capable of achieving both of excellent mechanical strength and resistance against reactivity with steel can be obtained. In $Ti_{1-X-Y}Nb_XW_YC_{1-Z}N_Z$, X exceeds 0 and is smaller than 1.

<First Step>

The first step is a step of obtaining powders of composite carbonitride expressed as $Ti_{1-X-Y}Nb_XW_YC_{1-Z}N_Z$. The first step includes a first operation of obtaining third powders by mixing first powders containing two elements of Ti and Nb or three elements of Ti, Nb, and W and second powders containing at least graphite, a second operation of obtaining a granulated material by granulating the third powders, a third operation of obtaining a powder precursor composed of the composite carbonitride by subjecting the granulated material to heat treatment at a temperature not lower than 1800° C. in an atmosphere containing nitrogen gas, and a fourth operation of obtaining the powders of the composite carbonitride by breaking the powder precursor.

(First Operation)

In the first operation, third powders are obtained by mixing first powders containing two elements of Ti and Nb or three elements of Ti, Nb, and W and second powders containing at least graphite.

The first powders contain two elements of Ti and Nb or three elements of Ti, Nb, and W. The first powders are preferably composed of oxide containing two elements of Ti and Nb or three elements of Ti, Nb, and W. When the first powders are composed of oxide, a primary particle size of powders of composite carbonitride obtained by the fourth operation which will be described later can readily be made finer, and hence a grain size at 50% of a number-based cumulative distribution (D50) of the core portion can be made smaller, for example, to at most 1.5 µm. The first powders may contain at least one element selected from the group consisting of V, Cr, and Mo as a component introduced from facilities used for manufacturing. In this case, in the first powders, a total content of V, Cr, and Mo is preferably lower than 2 atomic % with respect to a total amount of Ti, Nb, W, V, Cr, and Mo. Specifically, the first powders can be composed of composite oxide such as $Ti_{0.9}Nb_{0.1}O_2$ or $Ti_{0.9}Nb_{0.05}W_{0.05}O_2$. The first powders may be mixed powders containing powders of oxide such as $TiO_2$, $Nb_2O_5$, and $WO_3$. An oxidation number of each element or a content of an impurity can be modified unless it is contrary to the object.

Second powders contain at least graphite. In the first operation, third powders are obtained by mixing the second powders and the first powders. Thus, in the third operation which will be described later, a reduction reaction of the oxide, a solid solution formation reaction as a result of mutual diffusion of Ti, Nb, and W in the reduced oxide, and a carbonitriding reaction of Ti, Nb, and W in a state of a solid solution can simultaneously and continuously proceed. Consequently, composite carbonitride can efficiently be obtained.

A conventionally known method can be employed for a method of mixing first powders and second powders. From a point of view of decrease in D50 (a particle size at 50% in a number-based cumulative distribution) of third powders, a mixing method with the use of a dry ball mill and a mixing method with the use of a wet ball mill high in crushing function can suitably be employed. A mixing method with the use of a rotary blade fluid mixer low in crushing function can also be applied. D50 of the third powders is found based on at least 100 particles which appear in a micrograph showing appearance observed at a magnification of 10000× with a scanning electron microscope (SEM). A diameter of a circle equal in area to a particle (an equivalent circular diameter) of all particles which appear in the micrograph is calculated with the use of image analysis software (for example, ImageJ), and an equivalent circular diameter of a particle at 50% in a number-based cumulative distribution is defined as D50 of third powders.

(Second Operation)

In the second operation, a granulated material is obtained by granulating the third powders. A conventionally known granulation method can be employed as the granulation method in the second operation. Examples of the granulation method can include a method with the use of an already known apparatus such as a spray dryer and an extrusion granulator. For granulation, for example, a binder component such as a wax material can be employed as appropriate as a binder. A shape and a dimension of a granulated material should not particularly be limited. A granulated material can be, for example, in a columnar shape having a diameter from 0.5 to 5 mm and a length from 5 to 20 mm.

(Third Operation)

In the third operation, a powder precursor composed of the composite carbonitride is obtained by subjecting the granulated material to heat treatment at a temperature not lower than 1800° C. in an atmosphere containing nitrogen gas. In the third operation, in an atmosphere containing nitrogen gas, oxygen in the oxide in the first powders contained in the granulated material reacts with graphite in the second powders, so that Ti, Nb, and W in the first powders are reduced. A solid solution formation reaction of reduced Ti, Nb, and W proceeds as a result of mutual diffusion. A carbonitriding reaction of reduced Ti, Nb, and W with nitrogen in the atmosphere and graphite in the second powders also simultaneously occurs. The powder precursor composed of the composite carbonitride expressed as $Ti_{1-X-Y}Nb_XW_YC_{1-Z}N_Z$ described above is thus formed.

In the third operation, when mixed powders obtained by mixing metal powders containing Ti, Nb, and W or carbonitride powders containing Ti, Nb, and W instead of first powders with second powders are subjected to heat treatment, a powder precursor composed of the composite carbonitride cannot be obtained. This is because a carbonitriding reaction of metal powders containing Ti, Nb, and W proceeds early in heat treatment and hence a solid solution formation reaction owing to mutual diffusion of Ti, Nb, and W does not proceed. Since carbonitride powders containing Ti, Nb, and W are chemically stable even in a high-temperature region exceeding 2000° C., a solid solution formation reaction owing to mutual diffusion of Ti, Nb, and W does not proceed.

An atmosphere in heat treatment in the third operation should not particularly be limited so long as it is an atmosphere containing nitrogen gas. Pure $N_2$ gas or a gas mixture obtained by mixing hydrogen gas ($H_2$ gas), argon gas (Ar gas), helium gas (He gas), or carbon monoxide gas (CO gas) into $N_2$ gas may be employed.

From a point of view of progress and acceleration of a reduction reaction, a solid solution formation reaction, and a carbonitriding reaction of first powders, a temperature during heat treatment in the third operation is not lower than 1800° C. and preferably not lower than 2000° C. From a point of view of prevention of excessive aggregation of a powder precursor obtained by heat treatment, the temperature is preferably not higher than 2400° C.

A time period for heat treatment in the third operation is preferably adjusted depending on D50 (a particle size at 50% in a number-based cumulative distribution) of first powders and second powders. For example, when third powders obtained by mixing the first powders and the second powders have D50 from 0.3 to 0.5 μm, a time period for heat treatment described above is suitably from 15 to 60 minutes. Preferably, as a value of D50 is smaller, a time period for heat treatment in the third operation is shorter, and as a value of D50 is larger, a time period for heat treatment in the third operation is longer.

In the third operation, a rotary continuous heat treatment apparatus such as a rotary kiln is preferably employed. This heat treatment apparatus includes an inclined rotary reaction tube. The heat treatment apparatus also further includes a heating mechanism which heats the rotary reaction tube, a gas introduction port for introducing gas containing nitrogen into the rotary reaction tube, a gas exhaust port for exhausting the gas containing nitrogen from the rotary reaction tube, an inlet for introducing a granulated material into the rotary reaction tube, and an outlet for taking out a powder precursor from the rotary reaction tube. Such a heat treatment apparatus is preferred because it can perform heat treatment of a granulated material under a constant condition and hence it can continuously and efficiently manufacture a powder precursor of composite carbonitride stable in quality.

In using the heat treatment apparatus in the third operation, initially, the rotary reaction tube is heated to a temperature not lower than 1800° C. by using the heating mechanism, and the inside of the rotary reaction tube is set to a nitrogen atmosphere by introducing gas containing nitrogen gas through the gas introduction port. The granulated material is subjected to heat treatment by continuously supplying the granulated material through the inlet in an upper portion of the rotary reaction tube, rotating the rotary reaction tube, and moving the granulated material through the inside of the rotary reaction tube. A powder precursor composed of composite carbonitride powders can thus be formed. The powder precursor can be taken out through the outlet in a lower portion of the rotary reaction tube.

(Fourth Operation)

In the fourth operation, powders of the composite carbonitride are obtained by breaking the powder precursor obtained above. A conventionally known breaking method can be used as a method of breaking the powder precursor. Powders of the composite carbonitride expressed as $Ti_{1-X-Y}Nb_XW_YC_{1-Z}N_Z$ can thus be obtained. In $Ti_{1-X-Y}Nb_XW_YC_{1-Z}N_Z$, X exceeds 0 and is smaller than 1, Y is not smaller than 0 and not greater than 0.05, and Z is not smaller than 0.3 and not greater than 0.6.

<Second Step>

The second step is a step of obtaining mixed powders by mixing the powders of the composite carbonitride described above, WC powders, and powders of an iron-group element. A conventionally known mixing method can be employed as a method of mixing these powders. Examples of the method can include a mixing method with the use of a dry ball mill and a mixing method with the use of a wet ball mill high in crushing function as well as a mixing method with the use of a rotary blade fluid mixer low in crushing function when powders are weakly aggregated.

<Third Step>

The third step is a step of obtaining a formed material by pressing the mixed powders described above. A conventionally known pressing method can be employed as a method of pressing the mixed powders. For example, a mold can be filled with the mixed powders, which can be formed into a prescribed shape at a prescribed pressure. Examples of a forming method include dry pressing, cold isostatic pressing, injection molding, and extrusion molding. A pressure at the time of forming is preferably approximately not lower than 0.5 ton-force/cm$^2$ (approximately 50 MPa) and not higher than 2.0 ton-force/cm$^2$ (approximately 200 MPa). A shape of the formed material should only be in conformity with a shape of a desired product, and a shape which is not excessively complicated is selected.

<Fourth Step>

The fourth step is a step of obtaining a sintered material by sintering the formed material described above. In a method of sintering the formed material, the formed material is preferably held for a prescribed period of time in a temperature region where a liquid phase appears. A sintering temperature is preferably not lower than 1300° C. and not higher than 1600° C. A holding time period is preferably not shorter than 0.5 hour and not longer than 2 hours and more preferably not shorter than 1 hour and not longer than 1.5 hour. An atmosphere during sintering is preferably an atmosphere of inert gas such as nitrogen or argon or vacuum (approximately 0.5 Pa or lower). After obtaining a sintered material as such, cemented carbide as a final product can be obtained by machining the sintered material as necessary. Cemented carbide obtained by such a manufacturing method can achieve both of excellent mechanical strength and resistance against reactivity with steel.

A composition and an atomic ratio of the powders of the composite carbonitride can be found by a conventionally known component analysis technique. For example, a composition (a metal, carbon, and nitrogen) and a content in the powders can be identified by inductive plasma emission spectroscopy, high-frequency combustion, or a thermal conductivity technique.

From a point of view of handleability and achievement of both of high hardness and high fracture toughness in application as a cutting tool which will be described later, D50 (a particle size at 50% in a number-based cumulative distribution) of the powders of the composite carbonitride is preferably not smaller than 0.3 μm and not greater than 1.5 μm. D50 of the powders of the composite carbonitride can be found in measurement with the use of a laser diffraction particle size distribution measurement instrument (a trademark "Microtrac® MT3000II" manufactured by Microtrac-BEL Corp.) with an index of refraction of particles being set to 2.4.

[Cutting Tool]

A cutting tool according to the present embodiment contains cemented carbide. Since the cutting tool according to the present embodiment contains cemented carbide which achieves both of excellent mechanical strength and resistance against reactivity with steel, it is excellent in mechanical strength such as wear resistance and chipping resistance and excellent also in resistance against reactivity with steel.

Examples of application of the cutting tool can include a drill, an end mill, a throwaway tip for drilling, a throwaway tip for end milling, a throwaway tip for milling, a throwaway tip for turning, a metal saw, a gear cutting tool, a reamer, a tap, a cutting bite, a wear resistant tool, or a tool for friction stir welding.

When the cutting tool is implemented as a throwaway chip, a substrate may or may not have a chip breaker. A cutting edge ridgeline portion which serves as a central portion of cutting in cutting of a work material may have a sharp edge (a ridge at which a rake face and a flank intersect with each other), may be honed (a sharp edge provided with R), may have a negative land (beveled), and may be honed and have a negative land.

The cutting tool according to the present embodiment includes a substrate composed of cemented carbide and a coating film which covers the substrate. Since the cutting tool further includes the coating film, it is higher in wear resistance and chipping resistance. The coating film may cover the entire surface or a part of the substrate (for example, a cutting edge which is a region highly contributing to cutting performance). A composition of the coating film which covers the substrate should not particularly be limited, and any conventionally known coating film can be adopted.

A conventionally known method can be employed as a method of covering a substrate composed of cemented carbide with a coating film. For example, physical vapor deposition (PVD) or chemical vapor deposition (CVD) can be employed. In particular, examples of PVD can include resistive thermal evaporation, electron beam (EB) evaporation, molecular beam epitaxy (MBE), ion plating, ion beam deposition, and sputtering.

EXAMPLES

Though the present invention will be described hereinafter in further detail with reference to Examples, the present invention is not limited thereto.

Example 1

<Fabrication of Samples 1 to 9 and Samples A and B>

(First Step)

TiO$_2$ powders (having a size of approximately 0.5 μm and manufactured by Kojundo Chemical Lab. Co., Ltd.) and Nb$_2$O$_5$ powders (having a size of approximately 1 μm and manufactured by Kojundo Chemical Lab. Co., Ltd.) were prepared as first powders. Graphite powders (having a size of approximately 5 μm and manufactured by Kojundo Chemical Lab. Co., Ltd.) were prepared as second powders. Third powders were obtained by mixing the powders at such blending ratios as achieving designed compositions of composite carbonitride shown in samples 1 to 9 and designed compositions of carbonitride shown in samples A and B in Table 1 (first operation). Mixing was performed by a ball mill method.

Then, a granulated material in a columnar shape having an average diameter of approximately 2.4 mm and an average length of approximately 10 mm was obtained by granulating the third powders with an extrusion granulator (an extrusion hole diameter it, being set to 2.5 mm) (second operation). An average diameter and an average length of the granulated material were measured with a micrometer.

A powder precursor composed of the composite carbonitride was obtained by subjecting the granulated material to heat treatment at 1800° C. in a nitrogen atmosphere by using the rotary kiln described above (third operation). Approximately thirty minutes were required for the granulated material to pass through a heating section in the rotary kiln.

Finally, powders of composite carbonitride in samples 1 to 9 and powders of carbonitride in samples A and B having designed compositions shown in Table 1 were obtained by breaking the powder precursor in a dry state with the use of a known breaker (a tumbling ball mill with the use of a superhard ball of ϕ 4.5 mm as a crushing medium) (fourth operation). A composition of the powders of the composite carbonitride and the carbonitride was measured with EDX by the method described above.

(Second Step)

Mixed powders were obtained by mixing 20 volume % of the powders of the composite carbonitride or the carbonitride described above, 65 volume % of commercially available WC powders (a trademark "WC-25" manufactured by Japan New Metals Co., Ltd.), and 15 volume % of commercially available Co powders as powders of an iron-group element (having a size of approximately 5 μm and manufactured by Kojundo Chemical Lab. Co., Ltd.). Mixing was performed by a ball mill method for 5 hours.

(Third Step)

A formed material was obtained by granulating the mixed powders with the use of camphor and ethanol and press-forming the granulated material at a pressure of 1 ton-force/cm$^2$ (approximately 98 MPa)).

(Fourth Step)

A sintered material was obtained by sintering the formed material in a vacuum atmosphere (0.1 kPa) under such conditions as a temperature of 1410° C. and a holding time period of one hour by a liquid phase sintering method. In succession, cutting tools (samples 1 to 9 and samples A and B) composed of cemented carbide shaped into SNGN120408 by cutting away a sintered skin of the sintered material with a diamond wheel at number (#) 400 (the number (#) representing smoothness, the larger number representing higher smoothness) were obtained.

A composition of the core portion of a second hard-phase particle in the cutting tools (cemented carbide) was analyzed with EDX with the method described above. Then, the composition matched with the composition of the powders of the composite carbonitride and the carbonitride shown in Table 1. It was further confirmed with EDX that the peripheral portion had a composition higher in content of W than a composition of the core portion (that is, TiNbCN) and the peripheral portion covered at least a part of the core portion. Table 1 shows a composition of the peripheral portion in each of samples 1 to 9 and samples A and B. In order to conduct a cutting test which will be described later, two cutting tools in each of samples 1 to 9 and samples A and B were fabricated. The cutting tools in samples 1 to 9 fall under an Example and the cutting tools in samples A and B fall under a Comparative Example.

<Cutting Test>

The cutting tools in samples 1 to 9 and samples A and B were subjected to a wear resistance test and a chipping resistance test under conditions below. Table 1 shows results.

(Wear Resistance Test)
Work material: SCM435
Peripheral speed: 300 m/min.
Feed: 0.15 mm/rev.
Depth of cut: 1 mm
Cutting fluid: Used In the wear resistance test, a cutting time period (unit of minute) until a wear width of a flank of a cutting edge in the cutting tool in each sample was equal to or greater than 0.2 mm was determined as a lifetime. As this time period is longer, wear resistance is evaluated as higher.

(Chipping Resistance Test)
Work material: SCM435 with a slot groove
Peripheral speed: 200 m/min.
Feed: 0.3 mm/rev.
Depth of cut: 2 mm
Cutting fluid: None In the chipping resistance test, the number of times (unit being times) of collision caused in the cutting edge until chipping of the cutting edge of the cutting tool in each sample was confirmed by a dynamometer and cutting sound was determined as a lifetime. As the number is larger, chipping resistance is evaluated as higher.

TABLE 1

| | Designed Composition of Composite Carbonitride $(Ti_{1-X-Y}Nb_XW_YC_{1-Z}N_Z)$ and Carbonitride (TiCN, NbCN) | | | | Result of Cutting Test | |
|---|---|---|---|---|---|---|
| | X | Y | Z | Composition of Peripheral Portion | Wear Resistance (Minute) | Chipping Resistance (Times) |
| Sample 1 | 0.1 | 0 | 0.5 | $Ti_{0.83}Nb_{0.09}W_{0.08}C_{0.54}N_{0.46}$ | 33.3 | 2232 |
| Sample 2 | 0.2 | 0 | 0.5 | $Ti_{0.73}Nb_{0.18}W_{0.09}C_{0.55}N_{0.45}$ | 27.5 | 2450 |
| Sample 3 | 0.3 | 0 | 0.5 | $Ti_{0.63}Nb_{0.27}W_{0.10}C_{0.55}N_{0.45}$ | 20.4 | 2058 |
| Sample 4 | 0.4 | 0 | 0.5 | $Ti_{0.53}Nb_{0.35}W_{0.12}C_{0.56}N_{0.44}$ | 17.5 | 2768 |
| Sample 5 | 0.5 | 0 | 0.5 | $Ti_{0.43}Nb_{0.43}W_{0.14}C_{0.57}N_{0.43}$ | 22.3 | 2842 |
| Sample 6 | 0.6 | 0 | 0.5 | $Ti_{0.34}Nb_{0.51}W_{0.15}C_{0.57}N_{0.43}$ | 22 | 3392 |
| Sample 7 | 0.7 | 0 | 0.5 | $Ti_{0.25}Nb_{0.59}W_{0.16}C_{0.58}N_{0.42}$ | 19.3 | 1918 |
| Sample 8 | 0.8 | 0 | 0.5 | $Ti_{0.16}Nb_{0.66}W_{0.18}C_{0.59}N_{0.41}$ | 17.1 | 2142 |
| Sample 9 | 0.9 | 0 | 0.5 | $Ti_{0.08}Nb_{0.73}W_{0.19}C_{0.59}N_{0.41}$ | 18.7 | 2032 |
| Sample A | 0 | 0 | 0.5 | $Ti_{0.94}W_{0.06}C_{0.53}N_{0.47}$ | 16.8 | 2004 |
| Sample B | 1 | 0 | 0.5 | $Nb_{0.8}W_{0.2}C_{0.6}N_{0.4}$ | 16 | 2328 |

Discussion

According to Table 1, it is understood that the cutting tools according to the Example (samples 1 to 9) were higher in mechanical strength of wear resistance and chipping resistance as well as in resistance against reactivity with steel based on these characteristics than the cutting tools according to the Comparative Example (samples A and B).

Example 2

<Fabrication of Samples 11 to 19 and Samples 111 to 116>

(First Step)

TiO$_2$ powders (having a size of approximately 0.5 μm and manufactured by Kojundo Chemical Lab. Co., Ltd.), Nb$_2$O$_5$ powders (having a size of approximately 1 μm and manufactured by Kojundo Chemical Lab. Co., Ltd.), and WO$_3$ powders (having a purity of 3 N and manufactured by Kojundo Chemical Lab. Co., Ltd.) were prepared as first powders. Graphite powders (having a size of approximately 5 μm and manufactured by Kojundo Chemical Lab. Co., Ltd.) were prepared as second powders. Third powders were obtained by mixing the powders at such a blending ratio as achieving designed compositions of composite carbonitride shown in samples 11 to 19 and samples 111 to 116 in Table 2 (first operation). Mixing was performed by a ball mill method.

Then, a granulated material in a columnar shape having an average diameter of approximately 2.4 mm and an average length of approximately 10 mm was obtained by granulating the third powders with an extrusion granulator (an extrusion hole diameter φ being 2.5 mm) (second operation). An average diameter and an average length of the granulated material were measured with a micrometer.

A powder precursor composed of the composite carbonitride was obtained by subjecting the granulated material to heat treatment at 1800° C. in a nitrogen atmosphere by using the rotary kiln described above (third operation). Approximately thirty minutes were required for the granulated material to pass through a heating section in the rotary kiln.

Finally, powders of the composite carbonitride in samples 11 to 19 and samples 111 to 116 having designed compositions shown in Table 2 were obtained by breaking the powder precursor in a dry state with the use of a known breaker (a tumbling ball mill with the use of a superhard ball of φ 4.5 mm as a crushing medium) (fourth operation). A composition of the powders of the composite carbonitride was measured with EDX with the method described above.

(Second Step)

Mixed powders were obtained by mixing 5 volume % of the powders of the composite carbonitride described above, 85 volume % of commercially available WC powders (a trademark "WC-25" manufactured by Japan New Metals Co., Ltd.), and 10 volume % of commercially available Co powders (having a size of approximately 5 μm and manufactured by Kojundo Chemical Lab. Co., Ltd.) as powders of an iron-group element. Mixing was performed by a ball mill method for 5 hours.

(Third Step)

A formed material was obtained by granulating the mixed powders with the use of camphor and ethanol and press-forming the granulated material at a pressure of 1 ton-force/cm$^2$ (approximately 98 MPa)).

(Fourth Step)

A sintered material was obtained by sintering the formed material in a vacuum atmosphere (0.1 kPa) under such conditions as a temperature of 1410° C. and a holding time period of one hour by a liquid phase sintering method. In succession, cutting tools (samples 11 to 19 and samples 111 to 116) composed of cemented carbide shaped into SNGN120408 by cutting away a sintered skin of the sintered material with a diamond wheel at number (#) 400 (the number (#) representing smoothness, the larger number representing higher smoothness) were obtained.

A composition of the core portion of a second hard-phase particle in the cutting tools (cemented carbide) was analyzed with EDX with the method described above. Then, the composition matched with the composition of the powders of the composite carbonitride in Table 2. It was further confirmed with EDX that the peripheral portion composed by enriching the composition of the core portion (that is, TiNbCN or TiNbWCN) with WC covered at least a part of the core portion. Table 2 shows a composition of the peripheral portion in each of samples 11 to 19 and samples 111 to 116 In order to conduct a cutting test which will be described later, three cutting tools in each of samples 11 to 19 and samples 111 and 116 were fabricated. The cutting tools in samples 11 to 19 and samples 111 and 112 fall under an Example and the cutting tools in samples 113 to 116 fall under a Comparative Example.

<Cutting Test>

The cutting tools in samples 11 to 19 and samples 111 to 116 were subjected to a wear resistance test, a chipping resistance test, and a test of resistance against reactivity with steel under conditions below. Table 2 shows results.

(Wear Resistance Test)
Work material: SCM435
Peripheral speed: 230 m/min.
Feed: 0.2 mm/rev.
Depth of cut: 2 mm
Cutting fluid: Used In the wear resistance test, a cutting time period (unit of minute) until a wear width of a flank of a cutting edge of the cutting tool in each sample was equal to or greater than 0.2 mm was determined as a lifetime. As this time period is longer, wear resistance is evaluated as higher.

(Chipping Resistance Test)
Work material: SCM435 with a slot groove
Peripheral speed: 100 m/min.
Feed: 0.5 mm/rev.
Depth of cut: 2 mm
Cutting fluid: None In the chipping resistance test, the number of times (unit being times) of collision caused in the cutting edge until chipping of the cutting edge in the cutting tool in each sample was confirmed by a dynamometer and cutting sound was determined as a lifetime. As the number is larger, chipping resistance is evaluated as higher.

(Test of Resistance Against Reactivity with Steel)
Work material: SCM435
Peripheral speed: 150 m/min.
Feed: 0.15 mm/rev.
Depth of cut: 1.5 mm
Cutting fluid: None In the test of resistance against reactivity with steel, a cutting time period (unit of minute) until a wear width of a flank of a cutting edge of the cutting tool in each sample was equal to or greater than 0.2 mm was determined as a lifetime. As this time period is longer, resistance against reactivity with steel is evaluated as higher.

TABLE 2

| | Designed Composition of Composite Carbonitride $(Ti_{1-X-Y}Nb_XW_YC_{1-Z}N_Z)$ | | | | Result of Cutting Test | | |
|---|---|---|---|---|---|---|---|
| | X | Y | Z | Composition of Peripheral Portion | Wear Resistance (Minute) | Chipping Resistance (Times) | Resistance Against Reactivity with Steel (min) |
| Sample 11 | 0.15 | 0 | 0.5 | $Ti_{0.78}Nb_{0.14}W_{0.08}C_{0.54}N_{0.46}$ | 15.1 | 5078 | 20.1 |
| Sample 12 | 0.10 | 0 | 0.3 | $Ti_{0.83}Nb_{0.09}W_{0.08}C_{0.72}N_{0.28}$ | 17.3 | 4501 | 17.3 |

TABLE 2-continued

| | Designed Composition of Composite Carbonitride $(Ti_{1-X-Y}Nb_XW_YC_{1-Z}N_Z)$ | | | Composition of Peripheral Portion | Result of Cutting Test | | |
|---|---|---|---|---|---|---|---|
| | X | Y | Z | | Wear Resistance (Minute) | Chipping Resistance (Times) | Resistance Against Reactivity with Steel (min) |
| Sample 13 | 0.10 | 0 | 0.5 | $Ti_{0.83}Nb_{0.09}W_{0.08}C_{0.54}N_{0.46}$ | 14.2 | 5028 | 19 |
| Sample 14 | 0.10 | 0 | 0.6 | $Ti_{0.83}Nb_{0.09}W_{0.08}C_{0.45}N_{0.55}$ | 14.1 | 5583 | 21.4 |
| Sample 15 | 0.20 | 0 | 0.3 | $Ti_{0.73}Nb_{0.18}W_{0.09}C_{0.73}N_{0.27}$ | 16.2 | 4056 | 18.5 |
| Sample 16 | 0.20 | 0 | 0.4 | $Ti_{0.73}Nb_{0.18}W_{0.09}C_{0.64}N_{0.36}$ | 16.8 | 4065 | 19.1 |
| Sample 17 | 0.20 | 0 | 0.6 | $Ti_{0.73}Nb_{0.18}W_{0.09}C_{0.46}N_{0.54}$ | 15.3 | 6051 | 25.8 |
| Sample 18 | 0.15 | 0.02 | 0.5 | $Ti_{0.76}Nb_{0.14}W_{0.1}C_{0.54}N_{0.46}$ | 19.5 | 6064 | 18.8 |
| Sample 19 | 0.15 | 0.05 | 0.5 | $Ti_{0.73}Nb_{0.14}W_{0.13}C_{0.54}N_{0.46}$ | 22.4 | 5534 | 15.5 |
| Sample 111 | 0.05 | 0 | 0.5 | $Ti_{0.89}Nb_{0.05}W_{0.06}C_{0.53}N_{0.47}$ | 13 | 4537 | 12.8 |
| Sample 112 | 0.25 | 0 | 0.5 | $Ti_{0.68}Nb_{0.23}W_{0.09}C_{0.55}N_{0.45}$ | 13.6 | 4096 | 11.5 |
| Sample 113 | 0.15 | 0 | 0.2 | $Ti_{0.78}Nb_{0.14}W_{0.08}C_{0.82}N_{0.18}$ | 18.7 | 3093 | 11.6 |
| Sample 114 | 0.15 | 0 | 0.7 | $Ti_{0.78}Nb_{0.14}W_{0.08}C_{0.36}N_{0.64}$ | 10.6 | 5059 | 22.3 |
| Sample 115 | 0.15 | 0.07 | 0.5 | $Ti_{0.72}Nb_{0.14}W_{0.14}C_{0.54}N_{0.46}$ | 21 | 5073 | 6.7 |
| Sample 116 | 0.15 | 0.10 | 0.5 | $Ti_{0.69}Nb_{0.14}W_{0.17}C_{0.54}N_{0.46}$ | 29.4 | 5090 | 4.3 |

Discussion

According to Table 2, it is understood that the cutting tools according to the Example (samples 11 to 19 and samples 111 and 112) were higher in mechanical strength of wear resistance and chipping resistance as well as in resistance against reactivity with steel than the cutting tools according to the Comparative Example (samples 113 to 116) and achieved both of these characteristics.

Example 3

<Fabrication of Samples 21 to 27>

In samples 21 to 27, first powders to which $V_2O_5$ (having a purity of 3 N and manufactured by Kojundo Chemical Lab. Co., Ltd.), $Cr_2O_3$ (having a size of approximately 3 μm and manufactured by Kojundo Chemical Lab. Co., Ltd.), and $MoO_3$ (having a purity of 3 N and manufactured by Kojundo Chemical Lab. Co., Ltd.) were added such that an impurity (V, Cr, and Mo) of which total content (atomic %) occupied in a total amount of Ti, Nb, W, V, Cr, and Mo was as shown in Table 3 was contained in a designed composition of the composite carbonitride were prepared. Cemented carbide was fabricated otherwise as in sample 11. In Example 3, a product was shaped into CNGN120404.

Cutting tools in samples 21 to 27 were fabricated by employing the cemented carbide in samples 21 to 27 as a substrate and covering the substrate with a coating film composed of TiAlN under PVD conditions below.

(PVD Condition)
AlTi target (having a target composition of Al:Ti=50:50)
Arc current: 100 A
Bias voltage: −100 V
Pressure in chamber: 4.0 Pa
Reaction gas: nitrogen The cutting tools in samples 21 to 27 were subjected to a cutting test (a chipping resistance test) under conditions below. Table 3 shows results.

(Chipping Resistance Test)
Work material: SCM415 with a slot groove
Peripheral speed: 120 m/min.
Feed: 0.4 mm/rev.
Depth of cut: 2 mm
Cutting fluid: None In the chipping resistance test, a time period for cutting was set to five minutes, and a sample in which no chipping was observed at the time point of lapse of five minutes was determined as a good product. For a sample of which chipping was visually observed by the time of lapse of five minutes, time when chipping was observed is shown in Table 3.

TABLE 3

| | Designed Composition of Composite Carbonitride $(Ti_{1-X-Y}Nb_XW_YC_{1-Z}N_Z)$ | | | Amount of Impurity atm. % | | | Chipping Resistance Test (min) |
|---|---|---|---|---|---|---|---|
| | X | Y | Z | Amount of V | Amount of Cr | Amount of Mo | |
| Sample 21 | 0.15 | 0 | 0.5 | 1 | 0 | 0 | 5 |
| Sample 22 | 0.15 | 0 | 0.5 | 0 | 1 | 0 | 5 |
| Sample 23 | 0.15 | 0 | 0.5 | 0 | 0 | 1 | 5 |
| Sample 24 | 0.15 | 0 | 0.5 | 0 | 0 | 2 | 3.1 |
| Sample 25 | 0.15 | 0 | 0.5 | 0 | 0 | 3 | 0.6 |
| Sample 26 | 0.15 | 0 | 0.5 | 0 | 1 | 1 | 1.8 |
| Sample 27 | 0.15 | 0 | 0.5 | 1 | 1 | 0 | 2.7 |

Discussion

According to Table 3, it is understood that the cutting tools in samples 21 to 23 in which a total content of V, Cr, and Mo occupied in a total amount of Ti, Nb, W, V, Cr, and Mo was lower than 2 atomic % were higher in chipping resistance than the cutting tools in samples 24 to 27.

Example 4

<Fabrication of Samples 31 to 36>

For samples 31 to 36, powders identical in amount of an impurity (V, Cr, and Mo) and in designed composition of composite carbonitride to sample 21 were used, and granularity of the powders was prepared to achieve D50 (a grain size at 50% in a number-based cumulative distribution) of the core portion shown in Table 4 by breaking the powders in advance by a ball mill method. Then, by performing the second, third, and fourth steps in Example 2, cutting tools in samples 31 to 36 composed of cemented carbide shaped into SNGN120408 were fabricated. These cutting tools were subjected to a chipping resistance test as in Example 2. Table 4 shows results.

TABLE 4

|  | Grain Size of Core Portion at 50% in Number-Based Cumulative Distribution (D50) | Chipping Resistance (Times) |
| --- | --- | --- |
| Sample 31 | 0.3 | 5425 |
| Sample 32 | 0.7 | 5779 |
| Sample 33 | 1.0 | 5632 |
| Sample 34 | 1.5 | 4764 |
| Sample 35 | 1.7 | 3979 |
| Sample 36 | 2.0 | 2974 |

Discussion

According to Table 4, it is understood that the cutting tools in samples 31 to 34 in which the core portion had D50 not greater than 1.5 μm were higher in chipping resistance than the cutting tools in samples 35 to 36.

Example 5

<Fabrication of Samples 41 to 46>

For samples 41 to 46, the first operation was performed by adjusting powders of composite carbonitride, WC powders, and Co powders in sample 11 described above to achieve a volume ratio (%) of the core portion occupied in cemented carbide shown in Table 5. Cutting tools composed of the cemented carbide were fabricated otherwise as in sample 11. In Example 5, a product was shaped into TNGN160404. In order to conduct a cutting test which will be described later, three cutting tools in each of samples 41 to 46 were fabricated.

The cutting tools in samples 41 to 46 were subjected to a wear resistance test, a chipping resistance test, and a test of resistance against reactivity with steel under conditions the same as in Example 2. Table 5 shows results.

TABLE 5

|  | | Result of Cutting Test | |
| --- | --- | --- | --- |
|  | Volume Ratio of Core Portion Occupied in Cemented Carbide | Wear Resistance (Minute) | Chipping Resistance (Times) | Resistance Against Reactivity with Steel (min) |
| Sample 41 | 2% | 12.6 | 6012 | 10.7 |
| Sample 42 | 10% | 20.1 | 5073 | 15.7 |
| Sample 43 | 15% | 25 | 4892 | 17.9 |
| Sample 44 | 20% | 27.5 | 4096 | 17.8 |
| Sample 45 | 25% | 29.6 | 2586 | 17 |
| Sample 46 | 30% | 30.3 | 1894 | 18.5 |

Discussion

According to Table 5, it is understood that the cutting tools in samples 41 to 44 in which a volume ratio (%) of the core portion occupied in cemented carbide was from 2 to 20 volume % were higher in mechanical strength of wear resistance and chipping resistance as well as resistance against reactivity with steel than the cutting tools in samples 45 and 46 and achieved both of the characteristics.

Though the embodiment and the examples of the present invention have been described as above, combination of features in each embodiment and example described above as appropriate is also originally intended.

It should be understood that the embodiment and the examples disclosed herein are illustrative and non-restrictive in every respect. The scope of the present invention is defined by the terms of the claims rather than the embodiment and the examples above and is intended to include any modifications within the scope and meaning equivalent to the terms of the claims.

REFERENCE SIGNS LIST a first hard-phase particle; b second hard-phase particle; ba core portion; bb peripheral portion; c metallic binder phase

The invention claimed is:

1. Cemented carbide comprising:
first hard-phase particles containing WC;
second hard-phase particles which contain carbonitride containing at least Ti and Nb; and
a metallic binder phase containing an iron-group element,
the second hard-phase particle including a granular core portion and a peripheral portion which covers at least a part of the core portion,
the core portion containing composite carbonitride expressed as $Ti_{1-X-Y}Nb_XW_YC_{1-Z}N_Z$, where Y is not smaller than 0 and not greater than 0.05 and Z is not smaller than 0.3 and not greater than 0.6, and
the peripheral portion being different in composition from the core portion,
wherein the peripheral portion is composed to be higher in content of W than the core portion.

2. The cemented carbide according to claim 1, wherein X is not smaller than 0.1 and not greater than 0.6.

3. The cemented carbide according to claim 1, wherein X is not smaller than 0.1 and not greater than 0.2.

4. The cemented carbide according to claim 1, wherein X is not smaller than 0.4 and not greater than 0.6.

5. The cemented carbide according to claim 1, wherein in the core portion, a total amount of V, Cr, and Mo occupied in a total amount of Ti, Nb, W, V, Cr, and Mo is smaller than 2 atomic %.

6. The cemented carbide according to claim 1, wherein the core portion has a particle size at 50% in a number-based cumulative distribution not greater than 1.5 μm.

7. The cemented carbide according to claim 1, wherein a volume ratio of the core portion in the cemented carbide is not lower than 2 volume % and not higher than 20 volume %.

8. A cutting tool comprising the cemented carbide according to claim 1.

9. The cutting tool according to claim 8, the cutting tool comprising:
a substrate composed of the cemented carbide; and
a coating film which covers the substrate.

10. A method of manufacturing cemented carbide according to claim 1, the method comprising:
a first step of obtaining powders of composite carbonitride expressed as $Ti_{1-X-Y}Nb_XW_YC_{1-Z}N_Z$;
a second step of obtaining mixed powders by mixing the powders of the composite carbonitride, WC powders, and powders of an iron-group element;
a third step of obtaining a formed material by pressing the mixed powders; and
a fourth step of obtaining a sintered material by sintering the formed material,
Y being not smaller than 0 and not greater than 0.05,
Z being not smaller than 0.3 and not greater than 0.6,
the first step including
a first operation of obtaining third powders by mixing first powders containing two elements of Ti and Nb or three elements of Ti, Nb, and W and second powders containing at least graphite,
a second operation of obtaining a granulated material by granulating the third powders,
a third operation of obtaining a powder precursor composed of the composite carbonitride by subjecting the granulated material to heat treatment at a temperature not lower than 1800° C. in an atmosphere containing nitrogen gas, and
a fourth operation of obtaining the powders of the composite carbonitride by breaking the powder precursor.

* * * * *